United States Patent
Song (10) Patent No.: US 6,823,012 B2
(45) Date of Patent: *Nov. 23, 2004

(54) METHOD AND SYSTEM FOR ESTIMATING MOTION VECTOR AT HIGH SPEED FOR LOW BIT-RATE CODING

(75) Inventor: Byung-cheol Song, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 466 days.

This patent is subject to a terminal disclaimer.

(21) Appl. No.: 10/097,440

(22) Filed: Mar. 15, 2002

(65) Prior Publication Data

US 2003/0063671 A1 Apr. 3, 2003

(30) Foreign Application Priority Data

Sep. 5, 2001 (KR) .................................. 2001-0054458

(51) Int. Cl.$^7$ ................................................ H04B 1/66
(52) U.S. Cl. .................... 375/240.16; 375/240.12; 375/240.26; 382/236; 382/235; 382/238; 382/239; 348/413; 348/416; 348/699; 348/411; 348/407; 348/700
(58) Field of Search ................ 375/240.16, 240.12, 375/240.26; 382/236, 235, 238, 239; 348/413, 416, 699, 411, 407, 700

(56) References Cited

U.S. PATENT DOCUMENTS 6,240,211 B1 * 5/2001 Mancuso et al. ............ 382/236
6,278,736 B1 * 8/2001 De Haan et al. .......... 375/240.16
6,483,928 B1 * 11/2002 Bagni et al. ................ 382/107

* cited by examiner

Primary Examiner—Shawn S. An
(74) Attorney, Agent, or Firm—Staas & Halsey LLP

(57) ABSTRACT

A method and system for estimating a motion vector (MV) at high speed for low bit-rate coding is provided. The method and system for estimating a motion vector includes (a) forming sum pyramids for a current block and search blocks of a search region (b) setting an initial $C_{min}$ to $C^L(\vec{d}^P;\lambda)$ (here, $C^l(\vec{d}_k;\lambda)$ is an error measure at layer l which is determined by the following equation, and l and $\vec{d}$ are 0 and (0,0), respectively:

$$C^l(d_k;\lambda) = SAD^l(d_k) + \lambda R(d_k)$$

(c) if l is L, performing operation (d), if $C^l(\vec{d};\lambda) > C_{min}$, performing operation (c) for a next candidate Motion Vector (MV) in the search region in a raster scanning method, after setting l to 0 (excluding (0,0) and $\vec{d}^P$), and otherwise performing operatoin (c) after setting l to l+1; (d) if $C^L(\vec{d};\lambda) < C_{min}$, updating $C_{min}$ as $C^L(\vec{d};\lambda)$, if $\vec{d}$ is the last candidate MV, performing operation (e), and otherwise performing operation (c) with the next candidate, after setting l to 0; (e) estimating the MV by determining the MV having $C_{min}$ as an optimal matcher. The motion vector estimation method is applied to a low bit-rate encoder, in which the ratio of motion vector is relatively high, so that motion vectors are estimated in real time.

6 Claims, 7 Drawing Sheets

$SAD^0 \leq SAD^1 \leq SAD^2$

METHOD AND SYSTEM FOR ESTIMATING MOTION VECTOR AT HIGH SPEED FOR LOW BIT-RATE CODING

CROSS-REFERENCE TO RELATED APPLICATIONS

This application claims the benefit of Korean Application No. 2001-54458 filed Sep. 5, 2001 in the Korean Industrial Property Office, the disclosure of which is incorporated herein by reference.

BACKGROUND OF THE INVENTION

1. Field of the Invention

The present invention relates to a block-based moving picture coding method and system, and more particularly, to a method and system for estimating a motion vector at high speed for low bit-rate coding.

2. Description of the Related Art

In a typical block-based moving picture encoder, most bits to be transmitted are taken by frame residuals, in which motion is compensated for, and motion vector information. In particular, in low bit-rate encoding, the ratio of motion vector information to total data becomes greater because the motion vector information is not reduced while the frame residual components are reduced in order to achieve low bit-rate transmission. Therefore, it is disadvantageous that the relative ratio of the motion vector information to the total data is not reduced.

In the conventional Block Matching Algorithm (BMA), each Motion Vector (MV) $\vec{d}=(d_x, d_y)$ is selected in a direction that minimizes encoding distortion, regardless of bit rates.

Figure 1:
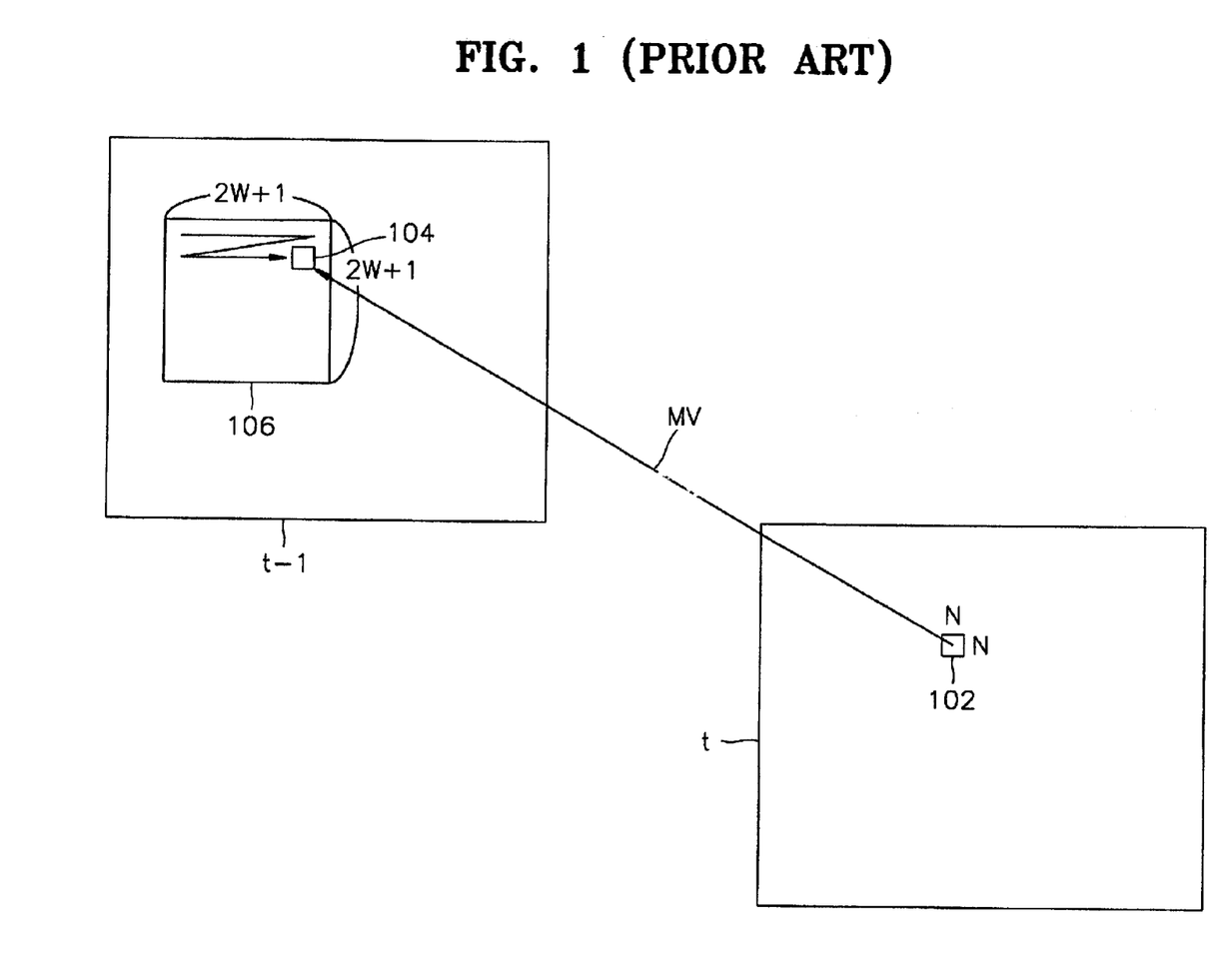
FIG. 1 is a schematic diagram of a block matching algorithm.

As shown in FIG. 1, which is a schematic diagram of a block matching algorithm, the motion vector MV of a predetermined block k is expressed by a coordinate difference between the block 102 of a current frame (t) and a matching block 104 of the previous frame (t-1). The matching block is found in a search region 106 centering around the current block. If a normal block size W is N×N, the size Ω of the search region 106 is (2W+1)×(2W+1).

The matching block in the search region 106 is a block in which the cost (not in the meaning of expense, but in the meaning of an error measure) is minimized, and is usually scanned in a raster scan method.

In general, the Sum of Absolute Differences (SAD) is frequently used as an error measure.

That is, among blocks in the search region 106, a block that satisfies the following formula 1 is determined as the matching block:

$$\min_{\vec{d} \in \Omega} SAD(\vec{d}) \quad (1)$$

Where $$SAD(\vec{d}) = \sum_{\vec{r} \in W} |I(\vec{r}, t) - I(\vec{r}+\vec{d}, t-1)|,$$

and $I(\vec{r}, t)$ is a brightness value (illuminance) at position $\vec{r}$ and frame t.

Recently, in order to improve the efficiency of low bit-rate moving picture encoding, instead of motion estimation methods of simply minimizing encoding distortion, motion estimation methods for minimizing encoding distortion under a limited bit-rate condition have been developed.

However, in these methods, a global search method should be used to estimate an accurate motion vector, and a great number of operations of the method are repeated until the motion vector is estimated. Therefore, it is impossible to encode moving pictures in real time.

SUMMARY OF THE INVENTION

To solve the above problems, it is an object of the present invention to provide an improved method and system for estimating a motion vector, in which the motion vector is estimated in a global search method at high speed.

Additional objects and advantageous of the invention will be set forth in part in the description which follows and, in part, will be obvious from the description, or may be learned by practice of the invention.

To accomplish the above and other objects of the present invention, there is provided a method of estimating a motion vector, the method including (a) forming sum pyramids for a current block and search blocks of a search region;

(b) setting an initial $C_{min}$ to $C^L(\vec{d}^P;\lambda)$ (where, $C^l(\vec{d}_k;\lambda)$ is an error measure at layer 1 which is determined by the following equation, and 1 and $\vec{d}$ are 0 and (0,0), respectively:

$$C^l(d_k;\lambda) = SAD^l(d_k) + \lambda R(d_k)$$

(c) if l is L, performing operation (d), if $C^l(\vec{d};\lambda) > C_{min}$, performing operation (c) for a next candidate Motion Vector (MV) in the search region in a raster scanning method, after setting l to 0 (excluding (0,0) and $\vec{d}^P$), and otherwise performing operation (c) after setting l to l+1;

(d) if $C^L(\vec{d};\lambda) < C_{min}$, updating $C_{min}$ as $C^L(\vec{d};\lambda)$, if $\vec{d}$ is the last candidate MV, performing operation (e), and otherwise performing operation (c) with the next candidate, after setting l to 0;

(e) estimating the MV by determining the MV having $C_{min}$ as an optimal matcher.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference refers to the like elements throughout. The embodiments are described below in order to explain the present invention by referring to the figures.

Figure 2:
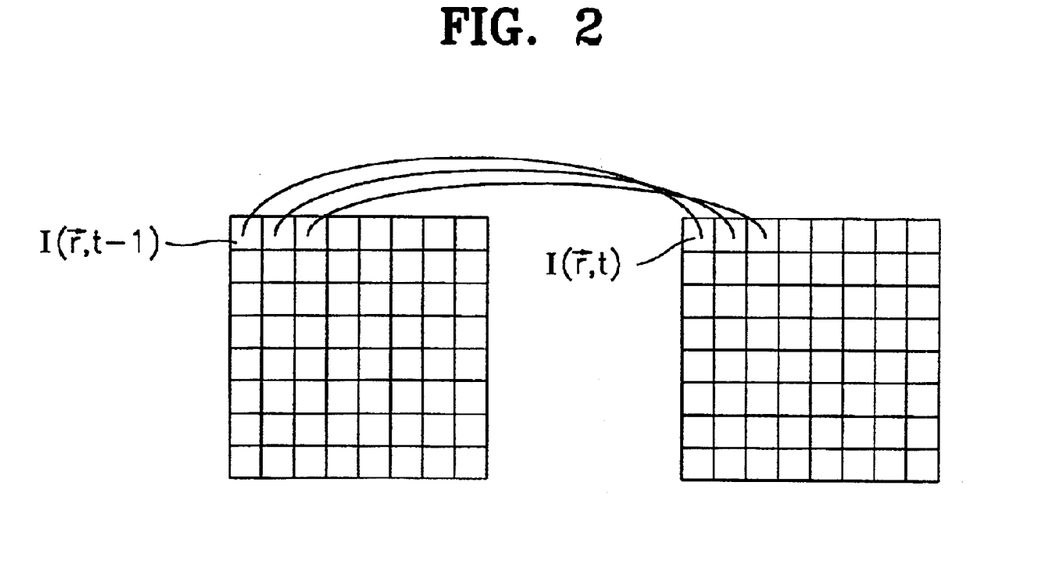
FIG. 2 is a schematic diagram of a method for obtaining the Sum of Absolute Differences (SAD) according to an embodiment of the present invention.

FIG. 2 is a schematic diagram of a method of obtaining a sum of absolute differences (SAD). The SAD is the sum of differences of brightness values of each corresponding picture element in a block of a current frame and an arbitrary block in a search region.

That is, as shown in FIG. 2, in order to obtain the SAD for a 16×16 size block, 16×16 times subtractions, (16×16)−1 times additions, and 16×16 times absolute calculations are needed. Also, in order to search for a matching block in the search region by the global search method, this SAD calculation should be repeated for all blocks in the search region. Therefore, the number of operations in the global search method is very large.

Assuming that each frame is divided into N×N blocks, and $\vec{d}_k$ denotes the MV of a block k, a motion estimation method with an optimal bit-rate limit is to find an MV field that minimizes a bit rate as well as distortion. That is, the method is for finding the MV field satisfying the following formula 2:

$$\min_{(d_1,\ldots,d_k)} \sum_{k=1}^{K} SAD(\vec{d}_k) + \lambda R(\vec{d}_k) \quad (2)$$

Here, $R(\vec{d}_k)$ denotes the bit amount of the motion vector of block k and λ denotes a Lagrange coefficient. A Lagrange minimization method is a representative method for solving this kind of optimization problem.

Actually, $R(\vec{d}_k)$ may be obtained by using an H.263 Huffman codebook. However, since MVs are differential encoded using the Huffman codebook, it is very difficult to obtain the solution of formula 2, and a very large number of operations is needed.

Therefore, in the present invention, in order to simplify the problem, each of the MVs is treated as if each one is independently encoded, though the MVs are differentially encoded. Then, formula 2 can be redefined as the following formula 3 for each block:

$$\min_{\vec{d}\in\Omega} C(d_k;\lambda) \quad (3)$$

In formula 3, $C(d_k;\lambda) = SAD(\vec{d}_k) + \lambda R(\vec{d}_k)$.

Thus, the solution of formula 3 is not a globally optimal solution but a locally optimal solution.

In searching an MV, if a Full Search Algorithm (FSA) is used, the best performance can be obtained, but due to the large number of operations, it causes a problem when moving picture encoding in real time is necessary. The Coban and Mersereau Algorithm used a triangle inequality to solve this problem.

The triangle inequality is based on the fact that the absolute value of the difference of two arbitrary numbers is always greater than or equal to the difference of the absolute values of the two numbers ($|A-B| \geq |A|-|B|$). If the triangle inequality is applied to formula 2, the following inequalities 4 and 5 are derived.

$$\sum_{\vec{r}\in W_k} |I(\vec{r},t)| - \sum_{\vec{r}\in W_k} |I(\vec{r}+\vec{d},t-1)| + +\lambda R_k(\vec{d}) \leq \quad (4)$$

$$\sum_{\vec{r}\in W_k} |I(\vec{r},t) - I(\vec{r}+\vec{d},t-1)| + +\lambda R_k(\vec{d})$$

$$\sum_{\vec{r}\in W_k} |I(\vec{r}+\vec{d},t-1)| - \sum_{\vec{r}\in W_k} |I(\vec{r},t)| + +\lambda R_k(\vec{d}) \leq \quad (5)$$

$$\sum_{\vec{r}\in W_k} |I(\vec{r},t) - I(\vec{r}+\vec{d},t-1)| + +\lambda R_k(\vec{d})$$

Assuming that the first term and second term of the left side of inequalities 4 are R and $M(\vec{d})$, respectively, and the first term of the right side is $SAD(\vec{d})$, inequalities 4 and 5 can be redefined as the following inequalities 6 and 7:

$$R - M(\vec{d}) + \lambda R_k(\vec{d}) \leq SAD(\vec{d}) + \lambda R_k(\vec{d}) \quad (6)$$

$$M(\vec{d}) - R + \lambda R_k(\vec{d}) \leq SAD(\vec{d}) + \lambda R_k(\vec{d}) \quad (7)$$

Assuming that $\vec{d}_{min}$ satisfies $$\vec{d}_{min} = \arg \min_{\vec{d}} SAD(\vec{d}) + \lambda R(\vec{d})$$

exists up to the present, an MV having a smaller cost should satisfy the following inequalities 8 and 9:

$$R - M(\vec{d}) + \lambda R_k(\vec{d}) \leq SAD(\vec{d}_{min}) + \lambda R_k(\vec{d}_{min}) \quad (8)$$

$$M(\vec{d}) - R + \lambda R_k(\vec{d}) \leq SAD(\vec{d}_{min}) + \lambda R_k(\vec{d}_{min}) \quad (9)$$

Inequalities 8 and 9 can be rearranged as the following inequalities 10 and 11:

$$R - SAD(\vec{d}_{min}) - \lambda R_k(\vec{d}_{min}) \leq M(\vec{d}) - \lambda R_k(\vec{d}) \quad (10)$$

$$M(\vec{d}) + \lambda R_k(\vec{d}) \leq R + SAD(\vec{d}_{min}) + \lambda R_k(\vec{d}_{min}) \quad (11)$$

Inequality 11 is applied to all MVs in the search region and it is determined whether or not each MV satisfies inequality 11. Thus, inappropriate MVs are removed in advance. Accordingly, by avoiding unnecessary matching processes with the smaller number of operations, the entire number of calculations decreases.

Figure 3:
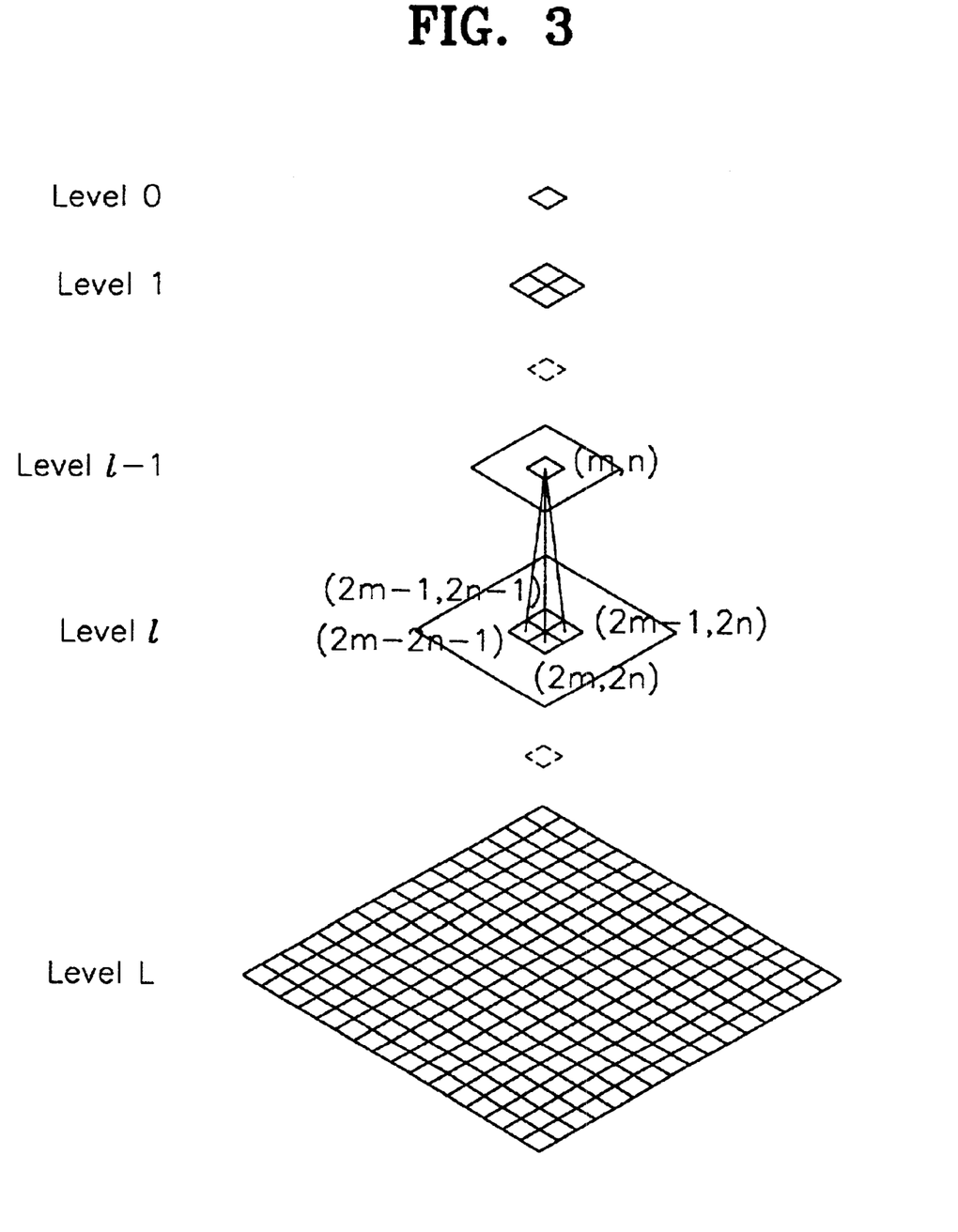
FIG. 3 is a schematic diagram of a sum pyramid.

FIG. 3 is a schematic diagram of a sum pyramid. First, as shown in FIG. 3, the sum pyramid of each search block $I_k$ is formed. The size of each search block is N×N and N is $2^L$.

Referring to FIG. 3, if the size of a block at the lowest level is 16×16, the size of a block at the next level is 8×8 (=16/2×16/2), the size of a block at the next level is 4×4 (=8/2×8/2), the size of a block at the next level is 2×2, and the size of a block at the highest level is 1.

An upper level has a picture element value corresponding to a value obtained by adding four picture element values at the level immediately below.

At this time, the sum pyramid of $I_k$ is defined as $\{I^0_k, \ldots, I^l_k, \ldots, I^L_k\}$. Here, the size of $I^l_k$ is $2^l \times 2^l$, and $I^{l-1}_k(\vec{r})$ is obtained by the following equation 12:

$$I^{l-1}_k(\vec{r}) = I^l_k(2\vec{r}-(1,1)) + I^l_k(2\vec{r}-(1,0)) + I^l_k(2\vec{r}-(0,1)) + I^l_k(2\vec{r}) \quad (12)$$

The SAD at level l, that is, $SAD^l(\vec{d}_k)$, is defined as the following equation 13:

$$SAD^l(\vec{d}_k) = \sum_{\vec{r} \in I_k} |I_k^l(\vec{r}, t) - I_k^l(\vec{r}, \vec{d}_k, t-1)| \quad (13)$$

Here, $I_k^l(\vec{r}, \vec{d}_k, t-1)$ is a block corresponding to the pyramid at level l of $I_k^l(\vec{r} + \vec{d}_k, t-1)$.

From the definition of equation 13, the following inequality 14 is always true:

$$SAD^L(\vec{d}_k) \geq \ldots \geq SAD^1(\vec{d}_k) \ldots \geq SAD^0(\vec{d}_k) \quad (14)$$

That is, the SAD at an upper level is always equal to or less than the SAD at a level below.

The sum pyramid is formed for each of search blocks in the search region, and is also formed for block k of which motion vector is desired to estimate.

Figure 5:
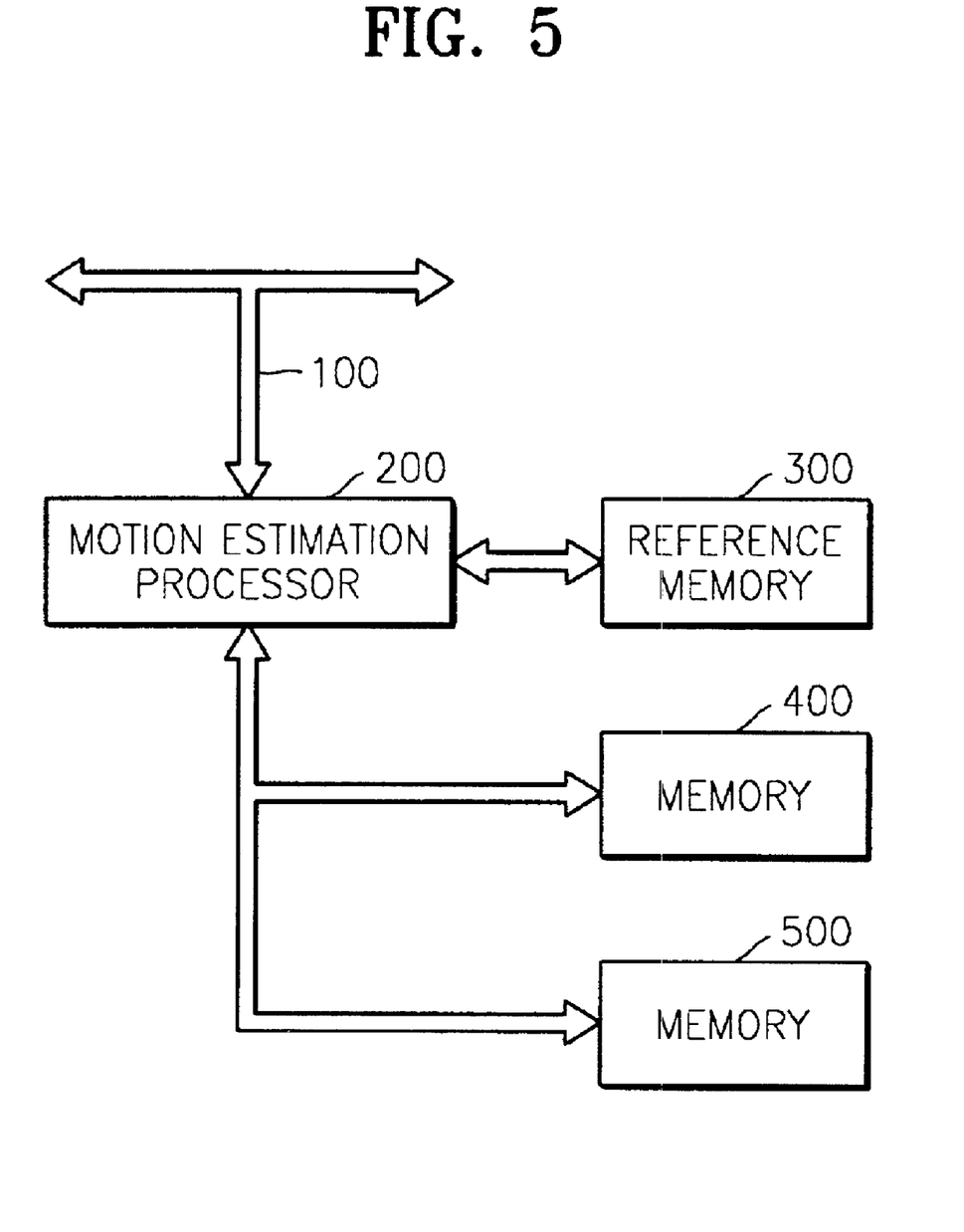
FIG. 5 is a block diagram showing a motion estimation processor and memories for an encoder and a decoder.

In FIG. 5 motion estimation (ME) proccessor 200 is connected to an encoding or decoding system through a bus 100. The sum pyramid of the block k is stored in a reference memory 300 while the sum pyramids of respective search blocks are stored in respective memories 400, 500. The ME proccessor 200 and memories 300, 400, 500 may be used for a decoder decoding motion vector data transmitted from an encoder in which the ME is performed.

Figure 6:
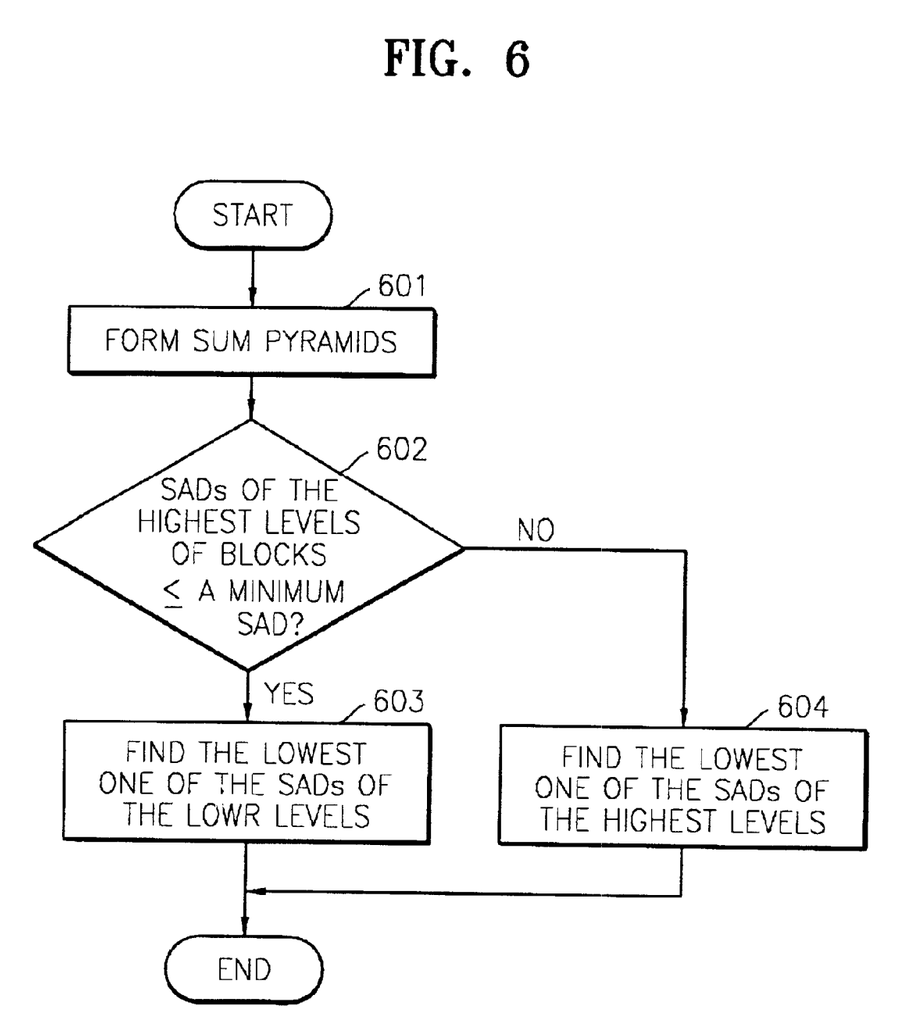
FIG. 6 is a flow chart showing a process of searching one of levels of the sum pyramid having a lowest SAD.

Motion estimation depending only on inequality 14 will now be explained as shown in FIG. 6.

First, sum pyramids are formed before search in operation 601. For a frame of which motion is to be estimated first, the sum pyramid of the current frame and the previous frames is calculated. For the next frames, only sum pyramids of the current frame is calculated.

Motion estimation by the global search is performed.

In performing the global search, the SAD of the highest level of each block is compared with a minimum SAD up to the present (the SAD obtained in the lowest level). If the SAD of the highest level of a block is greater than a minimum SAD up to the present (the SAD obtained in the lowest level) in operation 602, the SAD at the lowest level of the block cannot be less than the minimum SAD up to the present. Therefore, a lowest one of the SADs of the highest levels is set to a matching block in operation 603, and then the next search block is searched.

Only when the SAD of the highest level of the sum pyramid of each block is equal to or less than the minimum SAD up to the present, the SAD of the lowest level of the block can be less than the minimum SAD up to the present, and therefore the SAD of the level immediatley below is compared in operation 604. A block having the lowest one of SADs corresponding levels is set to a matching block in operations 603, 604.

Figure 4:
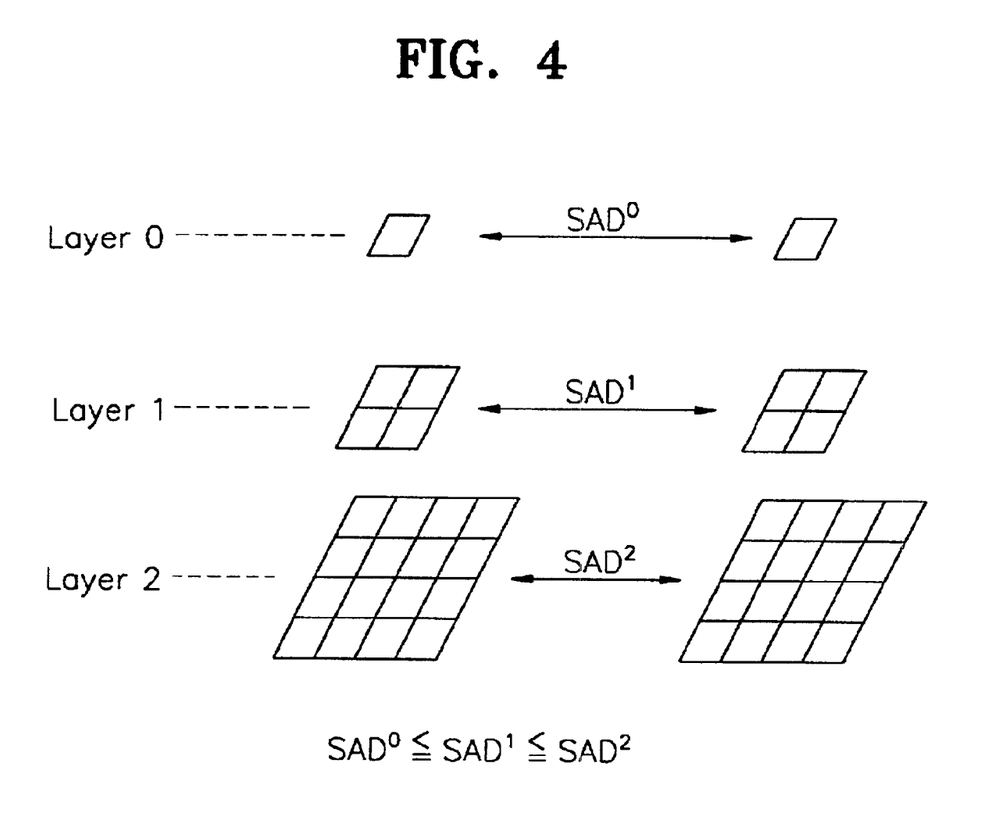
FIG. 4 is a schematic diagram of a block matching process using a sum pyramid.

FIG. 4 is a schematic diagram of a block matching process using a sum pyramid. In FIG. 4, a 3-layer sum pyramid is shown. It is assumed that the left pyramid is the sum pyramid of the current block and the right pyramid is the sum pyramid of a search block.

Because the SAD at an upper layer is less than or equal to the SAD of the layer below, a block having smaller cost can be determined only by comparing the SADs of upper levels.

For example, in FIG. 4, if the SAD at layer 0 is greater than the minimum SAD up to the present, the SAD at the lowest level (layer 2) is greater than the minimum SAD up to the present. The SAD at the lowest level (layer 2) is obtained by formula 2, and requires much calculation. Therefore, by removing this calculation, the number of calculations for motion estimation can be reduced.

Inversely, if the SAD at layer 0 is equal to or less than the minimum SAD up to the present, the SAD at the lowest level (layer 2) may be less than the minimum SAD up to the present. In this case, the SAD at the next highest level is compared.

If the SAD at the next highest level is greater than the minimum SAD up to the present, the SAD at the lowest level (layer 2) is greater than the minimum SAD up to the present. Therefore, the SAD calculation at the lowest level (layer 2) can be removed.

On the contrary, if the SAD at the next highest level is equal to or less than the minimum SAD up to the present, the SAD at the lowest level (layer 2) may be less than the minimum SAD up to the present. Only in this case, the SAD calculation at the lowest level is performed.

Therefore, the process includes the operations of forming a first sum pyramid of a first searching block in a search region, the first sum pyramid including the layer 0 having minimum resolution data, such as SAD 0, the layer 1 having medium resolution data, such as SAD 1, and the layer L having maximum resolution data, such as SAD L, making a first determination of whether one of the minimum resolution data of the layer 0, the first medium data of the layer 1, and the maximum resolution data of the layer L of the searching block is less than a reference, generating a second searching block data in response to the first determination, forming a second sum pyramid of a second searching block of said search region, the second sum pyramid including a second layer 0 having second minimum resolution data, a second layer 1 having second medium resolution data, and a second layer L having maximum resolution data, making a second determination of whether one of the second minimum resolution data of the second layer 0, the second medium data of the second layer 1, the second maximum resolution data of the second layer L of the second searching block is less than the reference after the first determination, generating a second searching block data in response to said second determination, and generating one of said first and second searching block data after comparing the first searching block data with the second searching block data.

The process makes the first determination without comparing the medium resolution data with the reference when the minimum resolution data, such as SAD 0 is greater than the reference and also makes the first determination without comparing the maximum resolution data, such as SAD L with the reference when one of the minimum and medium resolution data SAD 0 and SAD 1 is greater than the reference.

Thus, by removing calculation for a block in which the SAD in an upper level of the sum pyramid is greater than the minimum SAD up to the present, with simple calculations, the number of calculations for searching a block is greatly reduced.

The number of calculations for forming a sum pyramid for an N×N size block is roughly $8N^2$ additions. Since each block matching process needs $2N^2-1$ calculations, this overhead roughly corresponds to 4 times block matching calculations.

Although the method of Coban and Mersereau Algorithm (CMA) may reduce the number of calculations more than the method which simply applies the FSA, the method of applying a condition based on inequality 11, however, cannot provide a satisfying search speed yet, and the speed is slow in low bit-rate encoding in real time.

Here, Lagrangian cost can be defined as the following equation 15:

$$C^l(d_k;\lambda) = SAD^l(d_k) + \lambda R(d_k) \quad (15).$$

From equation 15, the following inequality 16 is finally obtained:

$$C^L(\vec{d}_k;\lambda) \geq \ldots \geq C^l(\vec{d}_k;\lambda) \ldots \geq C^0(\vec{d}_k;\lambda) \quad (16).$$

Considering inequality 16, a Rate-Constrained Fast Full Search Algorithm (RC-FFS) according to the present invention can be derived.

Figure 7:
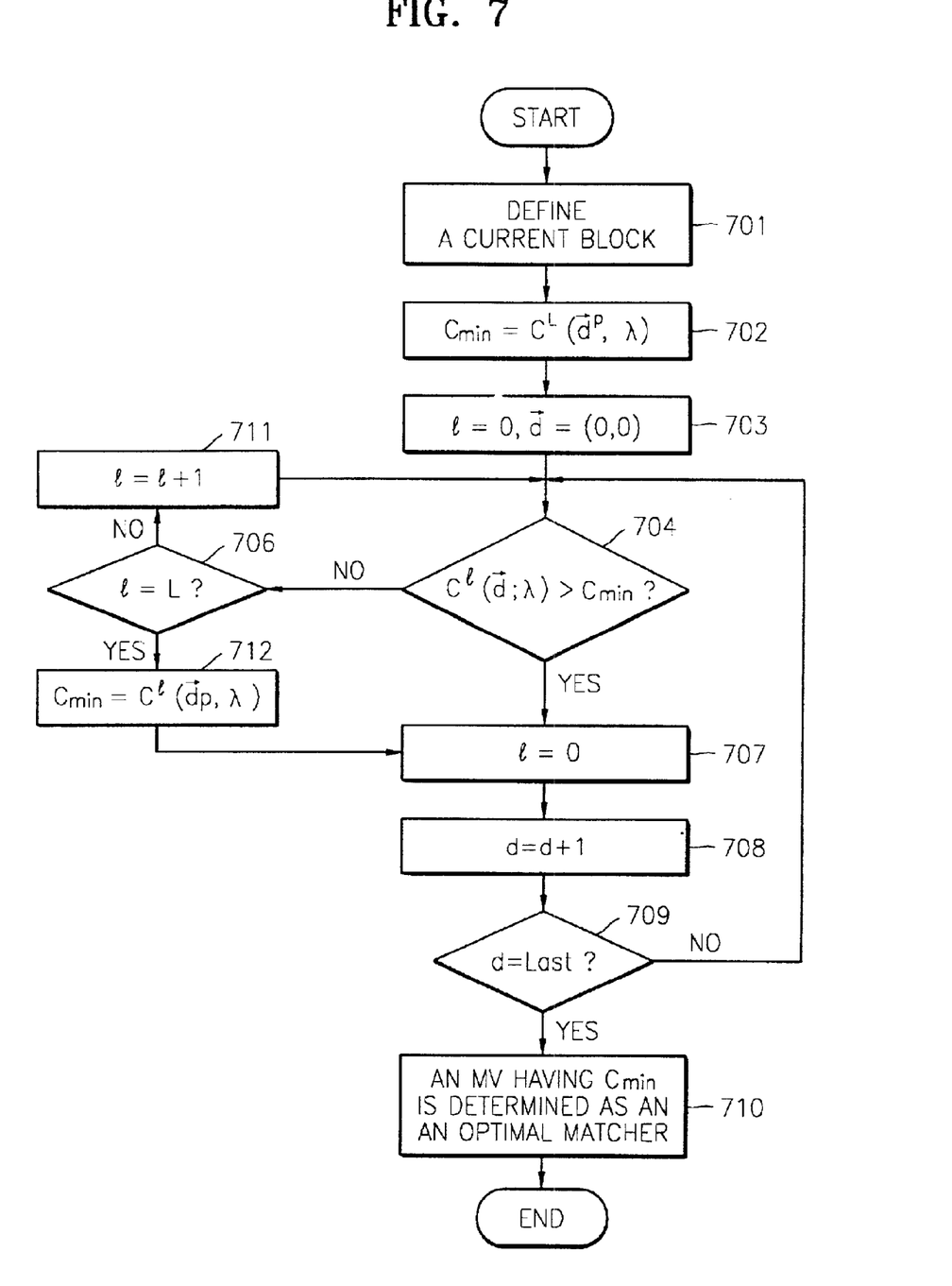
FIG. 7 is a flow chart showing a process of searching a block having an optimal motion vector.

A motion estimation method according to the present invention will now be explained in detail as shown in FIG. 7.

First, a predictive motion vector ($\vec{d}^P$) for a current block is defined in operation 701.

It is assumed that cost corresponding to $\vec{d}^P$ is the minimum cost up to the present $C_{min}$. Because $\vec{d}^P$ has great infuence on the entire calculation speed, determining $\vec{d}^P$ is very important.

For example, as in H.263 motion vector encoding, $\vec{d}^P$ can be determined through media filtering. Then, the RC-FFS for a predetermined λ can be explained as follows.

An initial $C_{min}$ is set to $C^L(\vec{d}^P;\lambda)$ in operation 702 after a current block is defined in operation 701. l and $\vec{d}$ are set to 0 and (0,0), respectively in operation 703.

If l is L in operation 706, and if $C^L(\vec{d};\lambda) < C_{min}$ in operation 704, operation 712 is performed. If l is not L in operation 706, l is replaced with l+1 in operation 711. If $C^l(\vec{d};\lambda) > C_{min}$ in operation 704, operations 707, 708, 709, and 709 are performed for searching a next candidate MV in the search region in a raster scanning method after setting l to 0 (excluding (0,0) and $\vec{d}^P$) in operation 707 and d to d+1 in operation 708, and otherwise operation 704 is performed again after setting l to l+1 in operation 711.

If $C^L(\vec{d};\lambda) < C_{min}$ in operation 704 and 706, $C_{min}$ is updated to $C^L(\vec{d};\lambda)$ in operation 712. If $\vec{d}$ is the last candidate MV in operation 709, operation 710 is performed, and otherwise with the next candidate MV, l is set to 0 in operation 707, d is set to d+1 in operation 708, and then operation 704 is performed for the next searching block.

An MV having $C_{min}$ is determined as an optimal matcher in operation 710.

The memory 300 may store $C_{min}$. The encoder and decoder having the ME proccessor 200 and memories 300, 400, 500 generates the MV data of the each current block corresponding to one of the layers of the searching block.

The process as shown in FIG. 7 includes the operations of preparing a first layer having first layer motion vector data in a first searching block, making a first comparison between the first layer motion vector data and a reference, preparing a second layer having second layer motion vector data in the first searching block and making a second comparison between the second layer motion vector and the reference in response to the first comparison, and generating a first searching block data from one of the first layer motion vector data and the second layer motion vector data in response to one of the first comparison and the second comparison.

The decoder may be used for receiving the MV data transmitted from the encoder. The decoder is provided with a second processor and second memories as shown in FIG. 5. The processor receives an encoded data signal from the encoder. The MV data included in the encoded data signal is decoded by the second processor of the decoder, and the decoded MV data may include a first layer motion vector data for a current block or a second layer motion vector data for a next current block. The memories store the decoded MV data. The first layer motion vector data and the second layer motion vector data each represent the respective error measure of one of the highest layer 0, the middle layer 1, and the lowest layer 2 in the respective best matching searching block. The first layer motion vector data corresponds to a first current block, and a second layer motion vector data corresponds to a second current block which is disposed adjacent to said first block. The first layer motion vector data may be different from or greater than the second motion vector data in resolution.

Table 1 shows the result of a simulation. The simulation is carried out for two Quadrature Common Interface Format (QCIF) images. Each sequence of which QCIF images is obtained from a foreman and a car-phone, respectively, is formed of 300 frames. The encoding frame rate is 15 Hz. Because the size of a macroblock is 16×16, [l is 4] L is 4, and the size of a motion search region is 31×31. The bit amount of an MV is obtained from the H.263 Huffman codebook.

The RC-FFS is compared with Coban-Mersereau Algorithm (CMA) and Rate-Constrained Full Search Algorithm (RC-FSA).

TABLE 1

| | | foreman | | | car-phone | | |
|---|---|---|---|---|---|---|---|
| | | RC-FFS | RC-FSA | RC-CMA | RC-FFS | RC-FSA | RC-CMA |
| λ = 0 | MV bit-rate | 441 | | | 389 | | |
| | PSNR(dB) | 33.2 | | | 33.9 | | |
| | ANOP | 52.7 | 2347 | 431.6 | 62.4 | 2347 | 362.9 |
| λ = 10 | MV bit-rate | 370 | | | 329 | | |
| | PSNR(dB) | 33.1 | | | 33.9 | | |
| | ANOP | 39.6 | 2347 | 340.6 | 36.5 | 2347 | 245.5 |
| λ = 20 | MV bit-rate | 338 | | | 311 | | |
| | PSNR(dB) | 33.1 | | | 33.9 | | |
| | ANOP | 35.6 | 2347 | 271.6 | 31.7 | 2347 | 180.7 |
| λ = 30 | MV bit-rate | 318 | | | 297 | | |
| | PSNR(dB) | 33.0 | | | 33.8 | | |
| | ANOP | 23.8 | 2347 | 220.7 | 29.2 | 2347 | 141.7 |

An Average Number of OPeration (ANOP) for a picture element is obtained by additions and sum of absolute values. The ANOP includes the operation number overhead for forming sum pyramids. The MV bit amount and PSNR are the same in the above three methods because all are global search methods.

Noticeably, as λ increases, the MV bit rate decreases in line with slight PSNR decrease (0.1–0.2 dB).

The ANOP of the RS-FSA is always 2347. However, the ANOPs of two other methods change with respect to the characteristcs of an image or λ. When λ=0, the ANOP of the RC-FFS is just 2.2–2.7% of that of the RC_FSA, and 12.2–15.5% of that of the CMA. Also, similarly to the MV bit amount, as λ increases, the ANOPs of the RC-FFS and the CMA decrease more. For example, when λ=0, the ANOP of the RC-FFS is just 1.2–1.4% of that of the RC-FSA.

In determining λ, an optimization method such as a repetitive method may be used, but its number of operations is too high. Instead, it may be preferable to use the statistical λ values obtained by simulations.

Actually, it is shown in the simulation that the PSNR did not change greatly with respect to λ values. As an example, by applying one λ value to all frames, motion estimation can be performed.

The motion vector estimation method according to the present invention is at maximum 8 times faster than the CMA, and at maximum 4–5 times faster than the three step search method.

Therefore, the motion vector estimation method according to the present invention is applied to a low bit-rate encoder, in which the ratio of motion vector is relatively high, so that motion vectors are estimated in real time.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A method of estimating a motion vector (MV), comprising:

(a) forming sum pyramids for a current block and search blocks of a search region, said sum pyramids including a plurality of layers (l) wherein l is in the range between 0 and L;

(b) setting an initial $C_{min}$ to $C^L(\vec{d}^P;\lambda)$ (where, $C^l(\vec{d}_k;\lambda)$ is an error measure at layer (l) which is determined by the following equation, and l and $\vec{d}$ are 0 and (0,0), respectively:

$$C^l(d_k;\lambda)=SAD^l(d_k)+\lambda R(d_k)$$

(c) if l is L, performing operation (d), if $C^l(\vec{d};\lambda)>C_{min}$, performing operation (c) for a next candidate Motion Vector (MV) in the search region in a raster scanning method, after setting l to 0 (excluding (0,0) and $\vec{d}^P$), and otherwise performing operation (c) after setting l to l+1;

(d) if $C^L(\vec{d};\lambda)<C_{min}$, updating $C_{min}$ as $C^L(\vec{d};\lambda)$, if $\vec{d}$ is the last candidate MV, performing operation (e), and otherwise performing operation (c) with the next candidate, after setting l to 0;

(e) estimating the MV by determining the MV having $C_{min}$ as an optimal matcher.

2. The method of claim 1, wherein the current error measure in operation (b) is determined by median filtering.

3. The method of claim 1, wherein the sum pyramid of an arbitrary block $I_k$ is defined as $I^0_k, \ldots, I^l_k, \ldots, I^L_k$, and $I^{l-1}_k(\vec{r})$ is obtained by the following equation:

$$I^{l-1}_k(\vec{r})=I^l_k(2\vec{r}-(1,1))+I^l_k(2\vec{r}-(1,0))+I^l_k(2\vec{r}-(0,1))+I^l_k(2\vec{r}).$$

4. The method of claim 3, wherein the size of $I^l_k$ is $2^l \times 2^l$.

5. The method of claim 1, wherein the error measure is $$\min_{(d_1,\ldots,d_k)} \sum_{k=1}^{K} SAD(\vec{d}_k) + \lambda R(\vec{d}_k), \text{ where,}$$

$$SAD(\vec{d}) = \sum_{\vec{r} \in W} |I(\vec{r},t) - I(\vec{r}+\vec{d},t-1)|, I(\vec{r},t)$$

brightness value (illuminance) at position $\vec{r}$ and frame t, $R(\vec{d}_k)$ denotes the bit amount of the motion vector of block k, and λ denotes a Lagrange coefficient.

6. The method of claim 5, wherein λ is a statistical value obtained by simulations.

* * * * *

UNITED STATES PATENT AND TRADEMARK OFFICE
CERTIFICATE OF CORRECTION

PATENT NO. : 6,823,012 B2
DATED : November 23, 2004
INVENTOR(S) : Byung-cheol Song It is certified that error appears in the above-identified patent and that said Letters Patent is hereby corrected as shown below:

Title page,
Item [57], ABSTRACT,
Line 14, change "operatoin" to -- operation --.

Column 10,
Line 17, before "brightness" insert -- is a --.

Signed and Sealed this

Twenty-eighth Day of June, 2005

JON W. DUDAS
*Director of the United States Patent and Trademark Office*